C. H. PATTEN.
EXPANSIBLE BRACELET.
APPLICATION FILED MAY 13, 1912.
1,046,850.
Patented Dec. 10, 1912.
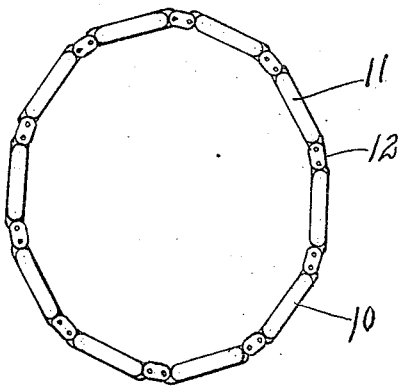
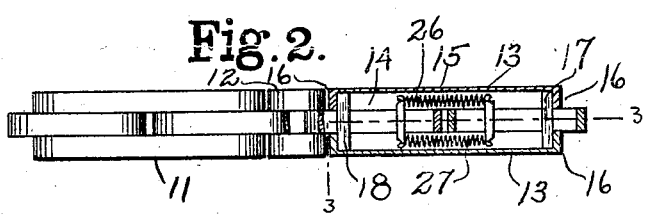
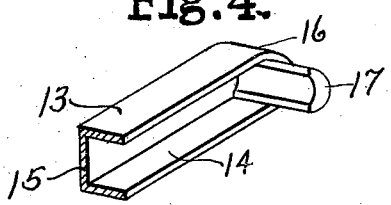
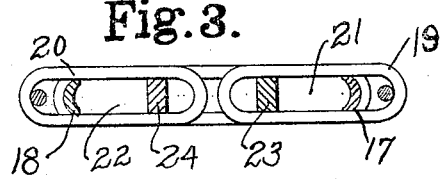
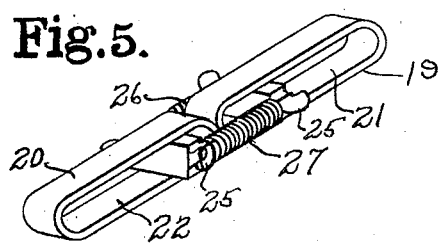
Inventor
Charles H. Patten.
Witnesses
Willard W. Bardsley
E. I. Ogden
By Howard E. Barlow
Attorney

UNITED STATES PATENT OFFICE.

CHARLES H. PATTEN, OF PROVIDENCE, RHODE ISLAND, ASSIGNOR TO CHARLES E. HANCOCK COMPANY, OF PROVIDENCE, RHODE ISLAND, A CORPORATION OF RHODE ISLAND.

EXPANSIBLE BRACELET.

1,046,850. Specification of Letters Patent. Patented Dec. 10, 19..

Application filed May 13, 1912. Serial No. 696,856.

*To all whom it may concern:*

Be it known that I, CHARLES H. PATTEN, a citizen of the United States, and resident of the city of Providence, in the county of Providence and State of Rhode Island, have invented certain new and useful Improvements in Expansible Bracelets, of which the following is a specification.

This invention relates to expansible bracelets and has for its object to provide in such a bracelet a plurality of extendible links each having two longitudinally movable members connected together on opposite sides with coil springs, said movable members being mounted between two relatively fixed trough-like side members. By this construction two light coil springs are provided in each extendible link so that if for any reason one of said springs should break, then the second spring would still remain to render that link effective.

With these and other objects in view, the invention consists of certain novel features of construction, as will be more fully described and particularly pointed out in the appended claims.

Of the accompanying drawings: Figure 1— is a view of an expansible bracelet constructed of my improved extendible links. Fig. 2— is an enlarged plan view of two of the extendible links connected together by a short link, one of said extendible links being in section. Fig. 3— is a side elevation, greatly enlarged, of one of the links sectioned on line 3—3 of Fig. 2, showing the guiding bars and arms which form bearings for the sliding links. Fig. 4— is a perspective view showing a portion of one of the side members with a connecting guide pin extending from one end thereof. Fig. 5— is a perspective view showing the two extendible members operatively connected together by the coil springs, one on either side thereof and the side members removed.

Referring to the drawing, 10 designates the expansible bracelet which is preferably made up of a combination of comparatively long extendible links 11 of my improved construction, joined together by comparatively short non-extendible links 12 whereby the bracelet is adapted to be expanded or made larger so as to readily pass over the end onto the arm of the wearer. Each of these extendible links is made up with an outer shell portion which is constructed of two elongated trough-shaped side members 13—13 each having its inner surface open and deep grooved as at 14, and having a closing back and end plate 15 and 16 respectively. The open portions of these side members are turned inward toward each other and their ends are spaced apart and permanently secured together by means of the cross bars 17 and 18 fixed at each end thereof by solder or otherwise.

At 19 and 20 are the two extendible members which are themselves preferably made of broad flat stock bent into a link form, each having a hollow middle portion 21, 22. These members are mounted end to end between said side frames 13, the cross bars 17 and 18 fitting closely in and extending through the center portion of members 19 and 20, serving to provide a bearing at one end for guiding these members in their longitudinal movement. In order to provide a second bearing for slidably supporting the opposite ends of each of these members I have inserted another pair of bars or arms 23 and 24 and fixed them one in each of these sliding members so that their opposite ends will extend outward laterally therefrom and enter and slide in the groove portion 14 in both side members, which second bearing holds these extendible members in perfect alinement with the shell or side members. The ends of each of these cross arms are slightly reduced as at 25 to receive the ends of the wire of the coil springs 26 and 27, which are arranged on either side of said members within the body of each side member with their opposite ends connected to the corresponding ends of both of said bars, by means of which these extendible members 19 and 20 are yieldingly held in contracted position. In assembling the parts of this link the arms 23 and 24 are secured by solder or otherwise to their respective members, the springs 26 and 27 are then attached to said arms, then the side members 13—13 are positioned with the extendible members between them, and the cross bars 17 and 18 soldered in position and the link is completed. This extendible link may be connected to the next extendible link by any suitable connecting member 12.

By my improved construction it will be seen that by the use of two springs acting independently upon each of said extendible members, if one should be broken for any reason there would still remain the second spring to render the link operative, thereby providing a very practical and efficient bracelet link with practically double the life and wearing power of the ordinary link where but a single spring is employed.

I claim:

1. A bracelet constructed of a plurality of compound extendible links, each of said links comprising a shell constructed of two trough-shaped side members spaced apart and rigidly secured by a cross bar extending between them at each of their opposite ends, two elongated band members positioned end to end mounted between said side members to slide longitudinally on said cross bars, a guide bar fixed to and projecting laterally from each side of each band into said side members, and a spring secured to and leading from each end of said arms and attached to corresponding ends of the arm in the other band to yieldably hold both bands in contracted position.

2. A bracelet constructed of a plurality of compound extendible links connected together, each of said links comprising two trough-shaped side members spaced apart and rigidly secured by a cross bar extending between them and fixed to each of their ends, two elongated band members having hollow center portions mounted between said side members to slide longitudinally on said cross bars, a guide bar fixed to and extending laterally through each of said band members into each of said side members, and a spring located in the trough of each side member secured to and leading from each end of said arms and attached to corresponding ends of the arm in the other band to yieldably hold both bands in contracted position.

In testimony whereof I affix my signature in presence of two witnesses.

CHARLES H. PATTEN.

Witnesses:
HOWARD E. BARLOW,
E. I. OGDEN.